T. A. ERRETT.
OX-ACETYLENE CUTTING AND WELDING TORCH.
APPLICATION FILED FEB. 14, 1917.
1,244,042.
Patented Oct. 23, 1917.
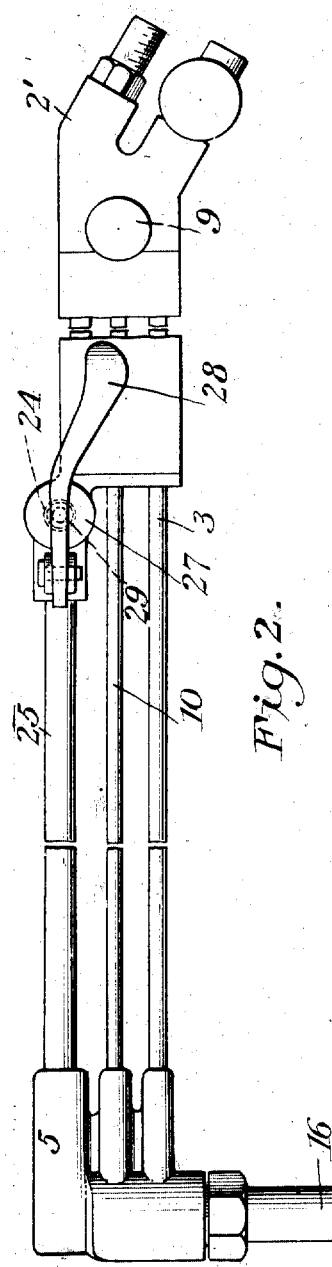
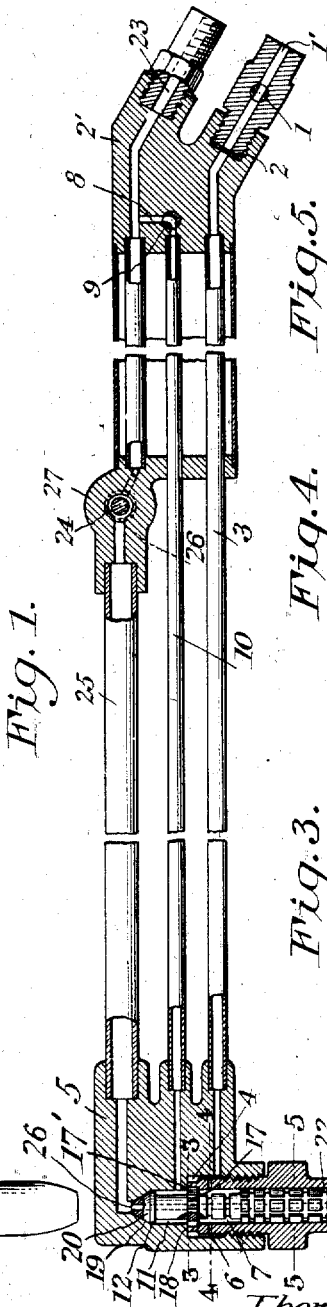
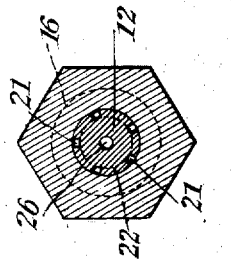
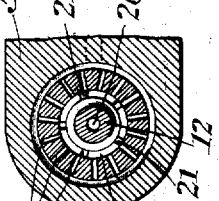
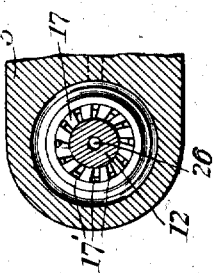
Inventor
Thomas A. Errett
By Franklin N. Hough
Attorney
Witnesses.
Fenton S Belt
A. L. Hough

UNITED STATES PATENT OFFICE.

THOMAS A. ERRETT, OF PORTLAND, OREGON, ASSIGNOR OF ONE-THIRD TO T. L. HANNING AND ONE-THIRD TO FRED ROBBINS, BOTH OF PORTLAND, OREGON.

OX-ACETYLENE CUTTING AND WELDING TORCH.

1,244,042.   Specification of Letters Patent.   Patented Oct. 23, 1917.

Application filed February 14, 1917. Serial No. 148,615.

*To all whom it may concern:*

Be it known that I, THOMAS A. ERRETT, a citizen of the United States, residing at Portland, in the county of Multnomah and State of Oregon, have invented certain new and useful Improvements in Ox-Acetylene Cutting and Welding Torches; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in ox-acetylene or ox-hydrogen cutting and welding torches in which oxygen or acetylene gas or oxygen and hydrogen gases are intimately mixed to form a circular preheating flame with a high pressure oxygen jet flame in the center, whereby the preheating flame will always be in advance of the cutting jet regardless of the position or movement of the torch.

Another feature of the invention resides in the construction of an ox-acetylene jet whereby the gases may be intimately mixed during their passage through the tip, thereby preventing back firing resulting in the flame working back through the gas passages of the torch and which causes the flame to break and damaging the head and causing dangerous explosions.

The invention consists further in the provision and arrangement of a valve for the convenience of the operator which is self closing and held seated by pressure and gas itself, resulting in economy in the use of gas.

The invention consists further in the provision in connection with the burning torch of fire screens positioned in the dangerous acetylene line and provided for the purpose of preventing flare backs and explosions while using low pressure gas.

Another and essential feature of the invention consists in the provision of a torch so constructed that the tips will be prevented from overheating by the provision of means for causing cold oxygen gas to blow upon the top end of the center tip, keeping the temperature below the ignition point and in the provision of means for causing the ox-acetylene gas to pass from the mixing chamber through very small flutes or passages which in turn are broken into short lengths by concentric recesses and whereby, in the event of flare backs, minute explosions will occur at the first intersection of flutes and recesses, causing a local high pressure which will extinguish the flame.

My invention is illustrated in the accompanying drawings, in which:—

Figure 1 is a central longitudinal view through a torch made in accordance with my invention.

Fig. 2 is a side elevation.

Fig. 3 is a sectional view on line 3—3 of Fig. 1.

Fig. 4 is a section on line 4—4 of Fig. 1.

Fig. 5 is a section on line 5—5 of Fig. 1.

Reference now being had to the details of the drawings by numerals, 1 designates an acetylene or hydrogen intake valve mounted in a passageway 1'. 2 is a fire screen positioned in the passageway in the head 2' which forms a suitable haft and with which passageway a pipe 3 communicates through which acetylene or hydrogen gas pass into an annular space 4 formed between the top of the outer tip 16 and the torch head casting 5. Minute holes 6 form passageways for the acetylene or hydrogen gas in the chamber 4 into the combining chamber 7 and which forms the first fire screen to prevent back firing. Oxygen is supplied to the ox-acetylene flame from the cross cut passage 8 to the valve 9 and the oxygen pipe 10 which leads to the chamber 11 formed between the top or the inner oxygen cutting tip 12 and the torch head 5, as shown in Fig. 1 of the drawings. A collar 17 is formed upon the cutting tip 12 and is adapted to seat against a shoulder 18 formed in the head 5. The top 19 of the oxygen tip 12 is cone-shaped, as shown, and fits into a socket 20 formed in the head 5, the oxygen chamber 11 being formed by the collar 17 and cone-shaped top 19 of the tip 12 inclosed in the head 5. A plurality of fine slits or cuts 17' are formed in the collar 17 and afford passages for the oxygen gas into the mixing chamber 7 and also form the fire screen to the oxygen gas and from which chamber the two gases (acetylene or hydrogen and oxygen) enter the flutes 21 formed in the outside walls of the oxygen tip 12, the latter being closed by the casing 16 and forms the outer or ox-acetylene preheating tip.

22 and 22' designate a plurality of annular recesses in the wall of the tip 12 and form interconnecting passageways between the flutes 21, the purpose of which will be presently described. 23 designates a high pressure oxygen intake passage from which oxygen is cross cut to the valve 9 of the low pressure oxygen line 10 and also supplies oxygen to the lever control valve 24 of the high pressure oxygen line 25. The passageway 26 extends through the center of the tip 12, forming the oxygen tip. A valve 24 in the casting 27 is adapted to be pressed from its seat by a lever 28, the valve 24 being normally held closed by spring 29.

It will be understood that in all cases acetylene or hydrogen gas may be used in combination with oxygen to form a preheating or welding flame.

In operation, hydrogen gas is admitted to the torch by the actuation of the valve 1, opening the passageway 1' through the fire screen 2, to the hydrogen line 3, thence to the chamber 4, through the screen 6 to the mixing chamber 7, thence through the flutes 21 to the orifice 30 where it is lighted. After the hydrogen flame is established, oxygen is turned on at the valve 9 through the oxygen line 10 to the chamber 11, through the oxygen fire screen 17' to the mixing chamber 7 where it joins the hydrogen gas in its passage through the flutes 21. It has been found in practice that the two gases do not mix readily but produce an irregular and inefficient flame but, by the provision of a burner made in accordance with my invention, this objection is overcome by the introduction of the annular recesses 22, which cut across the flutes 21 at right angles and the rapidly flowing gases as they strike against the corners of the mixers, formed by the cuts 21 and 22, set up whorls and cross currents which produce a perfectly mixed gas of the highest efficiency. By means of the valve 9, the amount of oxygen may be accurately gaged to produce the required jet of flame.

In cutting, when the work has been sufficiently preheated by the ox-hydrogen gas jet, the high pressure oxygen is admitted through the actuation of the valve 24 into the line 25 through the passage 26 to the orifice 30 where it sets up an oxidizing flame of great heat and power and, by means of the lever controlled valve 24, the regulation is, at all times, under perfect control of the operator.

What I claim to be new is:—

A cutting and welding torch comprising a torch head with ducts therein, valve-regulated pipes communicating with said ducts and having connection with a handle, said head having a chambered portion with a shoulder in its wall, an oxygen cutting tip fitted in said chambered portion and provided with a central duct communicating with one of the ducts in the head and through which oxygen is admitted, said tip having a collar engaging said shoulder and provided with slits in the marginal edge thereof, a space above the shoulder forming an oxygen chamber and with which a supply duct in the head communicates, the space about the collar below said shoulder forming a mixing chamber which communicates through said slots in the oxygen chamber, said tip having a series of annular recesses communicating with fluted channels, an outer preheating tip fitted over said oxygen tip and fitted within said head and having threaded connection therewith, a slight space intervening between the inner end of said outer preheating tip and said collar, forming communicating passageways between the mixing chamber and said annular recesses.

In testimony whereof I hereunto affix my signature in presence of two witnesses.

THOMAS A. ERRETT.

Witnesses:
W. A. TOMPKINS,
CHAS. E. MACE.